United States Patent
Rankin

(10) Patent No.: US 11,689,543 B2
(45) Date of Patent: Jun. 27, 2023

(54) SYSTEM AND METHOD FOR DETECTING TRANSMISSION OF A COVERT PAYLOAD OF DATA

(71) Applicant: John Rankin, Williamsport, OH (US)

(72) Inventor: John Rankin, Williamsport, OH (US)

(73) Assignee: Rankin Labs, LLC, Williamsport, OH (US)

( * ) Notice: Subject to any disclaimer, the term of this patent is extended or adjusted under 35 U.S.C. 154(b) by 213 days.

(21) Appl. No.: 16/939,233

(22) Filed: Jul. 27, 2020

(65) Prior Publication Data

US 2020/0358791 A1 Nov. 12, 2020

Related U.S. Application Data

(63) Continuation-in-part of application No. 16/534,511, filed on Aug. 7, 2019, now Pat. No. 10,728,220.

(60) Provisional application No. 62/717,202, filed on Aug. 10, 2018.

(51) Int. Cl.
*H04L 9/40* (2022.01)

(52) U.S. Cl.
CPC ...... *H04L 63/1408* (2013.01); *H04L 63/0209* (2013.01)

(58) Field of Classification Search
CPC .................. H04L 63/1408; H04L 63/0209
See application file for complete search history.

(56) References Cited

U.S. PATENT DOCUMENTS

| | | | |
|---|---|---|---|
| 3,688,090 A | 8/1972 | Rankin | |
| 6,023,724 A | 2/2000 | Bhatia et al. | |
| 6,567,416 B1 | 5/2003 | Chuah | |
| 6,714,985 B1 | 3/2004 | Malagrino et al. | |
| 6,757,248 B1 | 6/2004 | Li et al. | |
| 7,103,025 B1 | 9/2006 | Choksi | |
| 7,215,684 B1 | 5/2007 | Rosen et al. | |
| 8,090,866 B1 | 1/2012 | Bashyam et al. | |
| 8,131,281 B1 | 3/2012 | Hildner et al. | |
| 8,374,091 B2 | 2/2013 | Chiang | |
| 8,397,151 B2 | 3/2013 | Salgado et al. | |
| 8,703,966 B2 | 5/2014 | Awano | |

(Continued)

FOREIGN PATENT DOCUMENTS

CN 103841118 A 6/2014

OTHER PUBLICATIONS

Mileva et al. (Covert Channels in TCP/IP Protocol Stack, Cent. Eur. J. Comp. Sci. • 4(2) • 2014 • 45-66) (Year: 2014).*

(Continued)

*Primary Examiner* — Oleg Korsak
(74) *Attorney, Agent, or Firm* — Standley Law Group LLP; Jeffrey S. Standley; Adam J. Smith

(57) ABSTRACT

Systems and methods for detecting transmission of covert payloads of data are provided. A datagram is received at a host within a network. A determination is made that processing the datagram creates an error condition. A determination is made that that the datagram contains a payload intended for covert transmission where at least one suspicious condition is present. The suspicious conditions include an encrypted payload, a destination not matching any known address for hosts within the network, a time to live value matching the number of gateways traversed by the datagram within the network, and a particular type of error condition.

14 Claims, 9 Drawing Sheets

(56) References Cited

U.S. PATENT DOCUMENTS

| | | |
|---|---|---|
| 9,203,755 B1 | 12/2015 | Wong |
| 9,350,663 B2 | 5/2016 | Rankin |
| 9,626,522 B1 | 4/2017 | Flowers, Jr. |
| 11,032,257 B1 | 6/2021 | Rankin |
| 2001/0017844 A1 | 8/2001 | Mangin |
| 2002/0041592 A1 | 4/2002 | Van Der Zee et al. |
| 2002/0054570 A1 | 5/2002 | Takeda |
| 2002/0071436 A1 | 6/2002 | Border et al. |
| 2002/0114341 A1 | 8/2002 | Sutherland et al. |
| 2003/0031198 A1 | 2/2003 | Currivan et al. |
| 2003/0115364 A1 | 6/2003 | Shu et al. |
| 2004/0210763 A1 | 10/2004 | Jonas |
| 2005/0058129 A1 | 3/2005 | Jones et al. |
| 2005/0105506 A1 | 5/2005 | Birdwell et al. |
| 2005/0286517 A1 | 12/2005 | Babbar et al. |
| 2006/0002681 A1 | 1/2006 | Spilo et al. |
| 2006/0034317 A1 | 2/2006 | Hong et al. |
| 2006/0133364 A1 | 6/2006 | Venkatsubra |
| 2007/0025388 A1 | 2/2007 | Abhishek et al. |
| 2007/0223395 A1 | 9/2007 | Lee et al. |
| 2008/0082661 A1 | 4/2008 | Huber |
| 2008/0104313 A1 | 5/2008 | Chu |
| 2009/0046717 A1 | 2/2009 | Li |
| 2009/0110003 A1 | 4/2009 | Julien et al. |
| 2010/0103830 A1 | 4/2010 | Salgado et al. |
| 2010/0281257 A1 | 11/2010 | Yamazaki et al. |
| 2011/0072234 A1 | 3/2011 | Chinya et al. |
| 2011/0149891 A1 | 6/2011 | Ramakrishna |
| 2011/0231564 A1 | 9/2011 | Korsunky et al. |
| 2012/0117376 A1 | 5/2012 | Fink et al. |
| 2012/0243539 A1 | 9/2012 | Keesara |
| 2012/0289250 A1 | 11/2012 | Fix et al. |
| 2012/0300648 A1 | 11/2012 | Yang |
| 2012/0307678 A1 | 12/2012 | Gerber et al. |
| 2013/0028121 A1 | 1/2013 | Rajapakse |
| 2013/0058231 A1 | 3/2013 | Paddon et al. |
| 2013/0343377 A1 | 12/2013 | Stroud et al. |
| 2014/0025806 A1 | 1/2014 | Robitaille et al. |
| 2014/0100014 A1 | 4/2014 | Bennett, III et al. |
| 2014/0173085 A1 | 6/2014 | Gupta |
| 2014/0254598 A1 | 9/2014 | Jha et al. |
| 2014/0280669 A1 | 9/2014 | Harper, III et al. |
| 2014/0294019 A1 | 10/2014 | Quan et al. |
| 2015/0100613 A1 | 4/2015 | Osiecki et al. |
| 2015/0229714 A1 | 8/2015 | Venkatsubra et al. |
| 2016/0269294 A1 | 9/2016 | Rankin |
| 2016/0366160 A1 | 12/2016 | Kapoor et al. |
| 2017/0012951 A1 | 1/2017 | Mennes |
| 2017/0041296 A1 | 2/2017 | Ford et al. |
| 2017/0090872 A1 | 3/2017 | Mathew et al. |
| 2017/0351575 A1 | 12/2017 | Baker et al. |
| 2018/0018147 A1 | 1/2018 | Sugawara |
| 2018/0102975 A1 | 4/2018 | Rankin |
| 2021/0344687 A1* | 11/2021 | Rankin ............... H04L 63/1425 |

OTHER PUBLICATIONS

Brown, J. et al., ARP Coaching Poisoning and Routing Loops in ad Hoc Networks, Mobile Networks and Applications, pp. 1306-1317, 2018.

Hansen, R. et al., Covert6: A Tool to Corroborate the Existence of IPv6 Covert Channels, Annual ADFSL Conference on Digital Forensics, Security Law, 2016.

Mileva, A. et al., Covert Channels in TCP/IP Protocol Stack—extended version—, Central European Journal of Computer Science, 2000.

York, D., Flooding Attack, Science Direct, 2021.

Information Sciences Institute, University of Southern California, RFC 791, Internet Protocol, DARPA Internet Program Protocol Specification, Sep. 1981.

Postel, J., RFC 792, Internet Control Message Protocol, DARPA Internet Program Protocol Specification, Sep. 1981.

Information Sciences Institute, University of Southern California, RFC 793, Transmission Control Protocol, DARPA Internet Program Protocol Specification, Sep. 1981.

McCann, J. et al., RFC 1981, Path MTU Discovery for IP version 6, Aug. 1996.

Mathis, M. et al., TCP Selective Acknowledgment Options, Oct. 1996.

Montenegro, G. et al., RFC 4944, Transmission of IPv6 Packets over IEEE 802.15.4 Networks, Sep. 2007.

Paxson et al., RFC 2330, Framework for IP Performance Metrics, May 1998.

Thubert, P. et al., LLN Fragment Forwarding and Recovery draft-thubert-6lo-forwarding-fragments-02, Nov. 25, 2014.

Li, T. et al., A New MAC Scheme for Very High-Speed WLANs, Proceedings of the 2006 International Symposium on a World of Wireless, Mobile and Multimedia Networks, 2006.

Arkin, O., ICMP Usage in Scanning, The Complete Know-How, Jun. 2001.

Thyer, J., Covert Data Storae Channel Using IP Packet Headers, SANS Institute, Information Security Reading Room, Jan. 30, 2008.

Mistree, B., PingFS, https://bmistree.com/pingfs/, pp. 1-27, Dec. 5, 2019.

Mileva, Aleksandra, Covert Channels in TCP/IP Protocol Stack—extended version—, Central European Journal of Computer Science, Accepted May 9, 2014, 22 pages.

\* cited by examiner

SYSTEM AND METHOD FOR DETECTING TRANSMISSION OF A COVERT PAYLOAD OF DATA

CROSS-REFERENCE TO RELATED APPLICATIONS

This application is a Continuation-In-Part of U.S. application Ser. No. 16/534,511 filed Aug. 7, 2019, which claims the benefit of U.S. Application Ser. No. 62/717,202 filed Aug. 10, 2018, the disclosures of each of which are hereby incorporated by reference as if fully restated herein.

TECHNICAL FIELD

Exemplary embodiments relate generally to systems and methods for detecting covert transmission of a payload of data.

BACKGROUND AND SUMMARY OF THE INVENTION

Two of the most important communication protocols used on the Internet and other similar networks are the Transmission Control Protocol (TCP) and the Internet Protocol (IP). Together, the TCP and IP protocols form core protocols of the larger Internet protocol suite used on packet-switched networks. That protocol suite is commonly referred to as the TCP/IP protocol because of the widespread adoption and implementation of the TCP and IP protocols.

The TCP/IP protocol was developed for the United States Advanced Research Projects Agency (ARPA). The TCP/IP protocol is a set of rules that enable different types of network-enabled or networked devices to communicate with each other. Those network devices communicate using TCP/IP standards, or formats, to transfer or share data. TCP/IP rules are generally established and maintained by the Internet Engineering Task Force (IETF). The IETF is an international community of network designers, operators, vendors, and researchers concerned with the Internet's architecture and operation. The IETF's mission is to produce technical and engineering documents that influence the way people design, use and manage the Internet with the goal of improving its operations and efficiencies. These documents include protocol standards, best current practices and information updates of various kinds, and are commonly referred to as Request for Comments (RFC).

TCP can be used to establish a bi-directional connection between two clients wherein activity begins with a request for information made by one client to another client. A "client" is any program or application that initiates requests for, or sends, information from one remote location to another. As used herein, the term "client" may refer to applications including, but not limited to, web browsers, web servers, file transfer protocol (FTP) programs, electronic mail programs, line printer (LPR) programs also known as print emulators, mobile phone apps, and telnet programs also known as terminal emulators, all of which operate conceptually in an application layer.

The TCP protocol is typically implemented as a "daemon" that is part of a TCP/IP stack of protocol layers. A daemon—also sometimes referred to interchangeably as a server or service—is generally a software component of a device that runs a background process. As used herein in relation to the operation of the TCP protocol, the term "daemon" is used to refer to a component of a networked device that sends (source daemon) or receives (destination daemon), and processes communications between remote clients according to the TCP standard.

A host is a device or system that runs or executes TCP/IP daemons. As used herein, the term "host" refers to any such device or system including, but not limited to, a server platform, a personal computer (PC), and any other type of computer or peripheral device that implements and runs TCP software. Generally, a host physically connects and links clients and daemons to TCP/IP networks, thereby enabling communication between clients.

TCP software accepts requests and data streams directly from clients and other daemons, sequentially numbering the bytes, or octets, in the stream during the time the connection is active. When required, it breaks the data stream into smaller pieces called segments (sometimes referred to as datagrams or packets) for transmission to a requesting client. The protocol generally calls for the use of checksums, sequence numbers, timestamps, time-out counters and retransmission algorithms to ensure reliable data transmission.

The IP layer actually performs the communication function between two networked hosts. The IP software receives data segments from the TCP layer, ensures that the segment is sized properly to meet the requirements of the transmission path and physical adapters (such as Ethernets and CTCs). The IP layer changes the segment size, if necessary, by breaking the segment down into smaller datagrams, and transmits the data to the physical network interface or layer of the host.

The network connecting devices are generally called gateways. These gateways communicate between themselves for control purposes. Occasionally, a gateway or destination host will communicate with a source host, for example, to report an error in datagram processing. For such purposes the Internet Control Message Protocol (ICMP) is used.

If the objective is to use the Internet service protocols to covertly deliver a payload, the payload's point of origin should remain secret and unobserved. Current protocols either expressly make the origin of a data payload known or easy to obtain. While it is possible to mask the payload transmission through encryption or other deceptive means, the discovery and observation might well lead back to the host of origin even if the payload is undeterminable. In other words, for a payload of data to be truly covert, the point of origin should be masked, potentially in addition to other protections offered during transmission.

Therefore, what is needed is a system and method for delivering information from one host to another while masking the payload's point of origin. The present disclosure provided a system and method for covertly transmitting a payload of data from one host to another by making the payload's point of origin.

One of the most effective methods to mask operational functions is to utilize the underlying TCP/IP protocols as they were designed, without alteration or augmentation. Furthermore, when properly implemented, the disclosed system and method may utilize an unsuspecting host as a supplanted replacement for the point of origin without the host's knowledge or participation. A discrete unit of information (the "payload") may be transmitted from an origin host to a destination host by way of a blind host. Preferably, the blind host is unaware of its involvement. The traffic coming from the blind host may appear to be the sole origin of the data. The blind host may have no record of the existence of the origin host. The net result of the process may be the delivery of a payload which appears to have originated at the blind host. In this way, the location and identify of the payload's true point of origin, the origin host, may remain undisclosed.

Such covert transmissions may be accomplished by using the blind host's requirement to produce error messages when it receives network traffic that appears to be in error. The origin host may create a datagram that contains a payload of information intended for covert delivery to the destination host. Rather than send this datagram directly to the destination host, the origin host may be configured to direct the traffic to the blind host. However, the source addresses in the datagram header may indicate that the datagram originated at the destination host. Furthermore, the datagram may intentionally contain a fatal flaw that will require the blind host to generate an error message and return it to the address indicated as the source—i.e., the destination host. Since the source address within the datagram in error indicates the destination host's address, the blind host may transmit the error message to the destination host. The error message may contain enough of the original datagram to include the payload intended to reach the destination host covertly.

By using this blind bounce back technique, it is possible to communicate between two hosts without directly forming a communication path or revealing the true origin of the message(s) containing the payload. By intentionally creating an error within the datagram with the incorrect source address, the blind host may bounce the message containing the payload back to a location that did not originate the message. The resulting process may leave the true origin of the message undetectable by involving an unrelated and unwitting participant in the transmission.

In other situations, it may be desirable to detect such covert transmissions, such as those utilizing a blind bounce back technique. Therefore, what is needed is a method and system that allows for the detection of such covert transmissions, such as those utilizing a blind bounce back technique. Such detection may permit elimination of the covert transmission packet as it is moving through a network. While the point of origin of such transmission may remain undiscernible, the activity itself may be detected, and potentially eliminated. Furthermore, the payload intended for covert transmission may be intercepted and decrypted. The network structure used to implement the blind bounce back technique, such as but not limited to an IP network utilizing ICMP, and its dependable production of error messages may permit the comparison and examination of such error messages to detect the use and implementation of a bounce back technique. Patterns of digital behavior that fit the blind bounce back technique for covert transmission may be monitored and detected.

Further features and advantages of the systems and methods disclosed herein, as well as the structure and operation of various aspects of the present disclosure, are described in detail below with reference to the accompanying figures.

BRIEF DESCRIPTION OF THE SEVERAL VIEWS OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
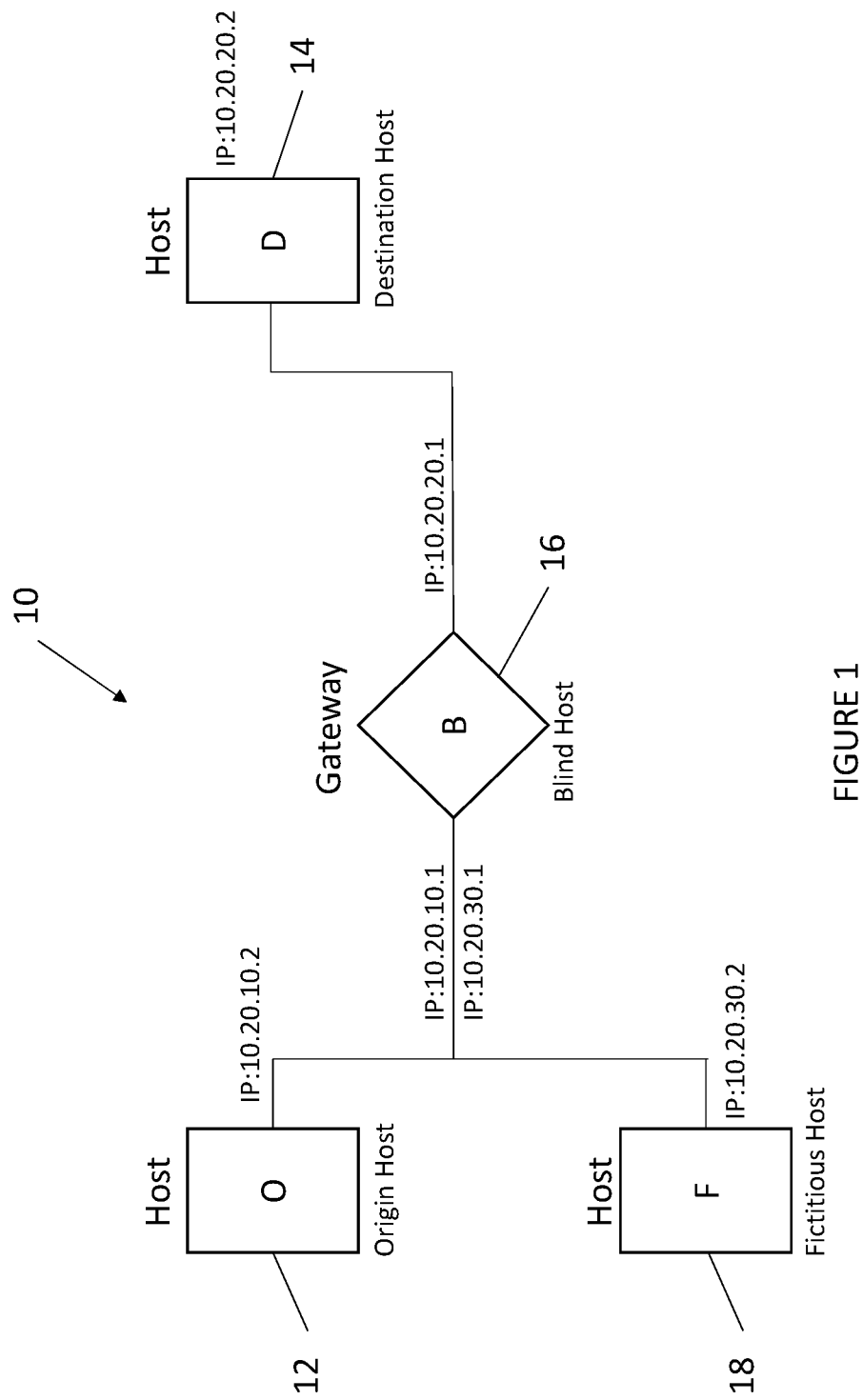
FIG. 1 is a simplified block diagram of a system connecting hosts in a network.

FIG. 1 is a simplified block diagram of a system connecting hosts 12, 14, 16, and 18 in a network 10. The network 10 may comprise a number of hosts 12, 14, 16, and 18. The hosts 12, 14, 16, and 18 may be placed in electronic communication with one another in a direct or indirect fashion. In exemplary embodiments, without limitation, the network 10 is an IP network such as the world wide web, though any type of internet, intranet, or other type of network is contemplated. Each host 12, 14, 16, and 18 may be a personal electronic device such as, but not limited to, a computer, server, laptop, desktop computer, database, smartphone, tablet, e-reader, some combination thereof, or the like. Such interconnected hosts 12, 14, 16, and 18 may include one or more origin hosts 12, one or more destination hosts 14, one or more blind hosts 16, and one or more fictitious hosts 18.

The origin host 12 may be a machine on the network 10. The origin host 12 may, in exemplary embodiments without limitation, operate simply as a host and not necessarily a gateway, though such is contemplated. The origin host 12 may originate the payload that is to be covertly transmitted to the destination host 14. As such, it may be desirable to conceal the relationship and identity of the origin host 12 in such transmission(s).

The destination host 14 may be a machine on the network 10. The destination host 14 may operate simply as a host and not necessarily a gateway, though such is contemplated. The destination host 14 may be the intended, and/or actual, recipient of the payload that originates at the origin host 12.

The blind host 16 may be a machine on the network 10. The blind host 16 may operate as a correctly implemented network gateway host. The blind host 16 may have a transmission path to both the destination host 14 and the origin host 12. This transmission path does not need to be on the same electric or wireless path, but must be reachable within the blind host's 16 gateway operations. Stated another way, the transmission path may be direct or indirect such that other gateways may be located between the blind host 16 and the destination host 14 and/or the origin host 12. The blind host 16 does not need to have previous knowledge of the other hosts 12, 14, and 18. The blind host 16 may not have any further interaction with the other hosts 12, 14, and 18 after transmission of the payload is performed.

The fictitious host 18 may be a machine that may or may not actually exist on the network 10 or elsewhere. In exemplary embodiments, without limitation, the fictitious host 18 is only necessary to provide a plausible reference address within the network 10. The fictitious host's 18 address may be plausibly reachable by the blind host 16 or some additional gateway series connected to the blind host 16 such that data from the fictitious host's 18 address is plausibly reachable from the blind host 16.

Figure 2:
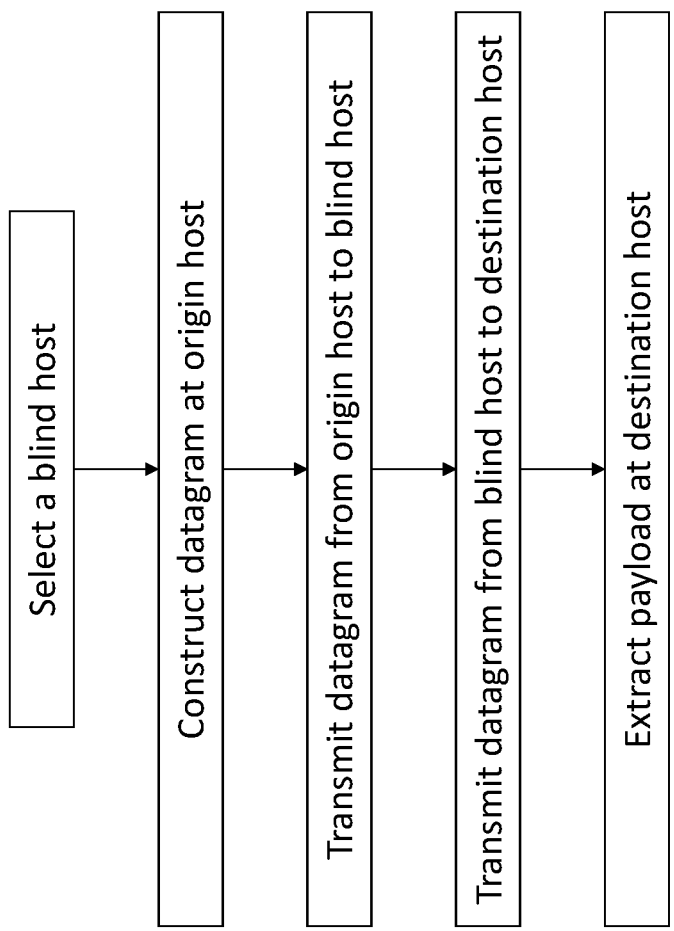
FIG. 2 is a flowchart with exemplary logic for covertly transmitting a payload.
Figure 3:
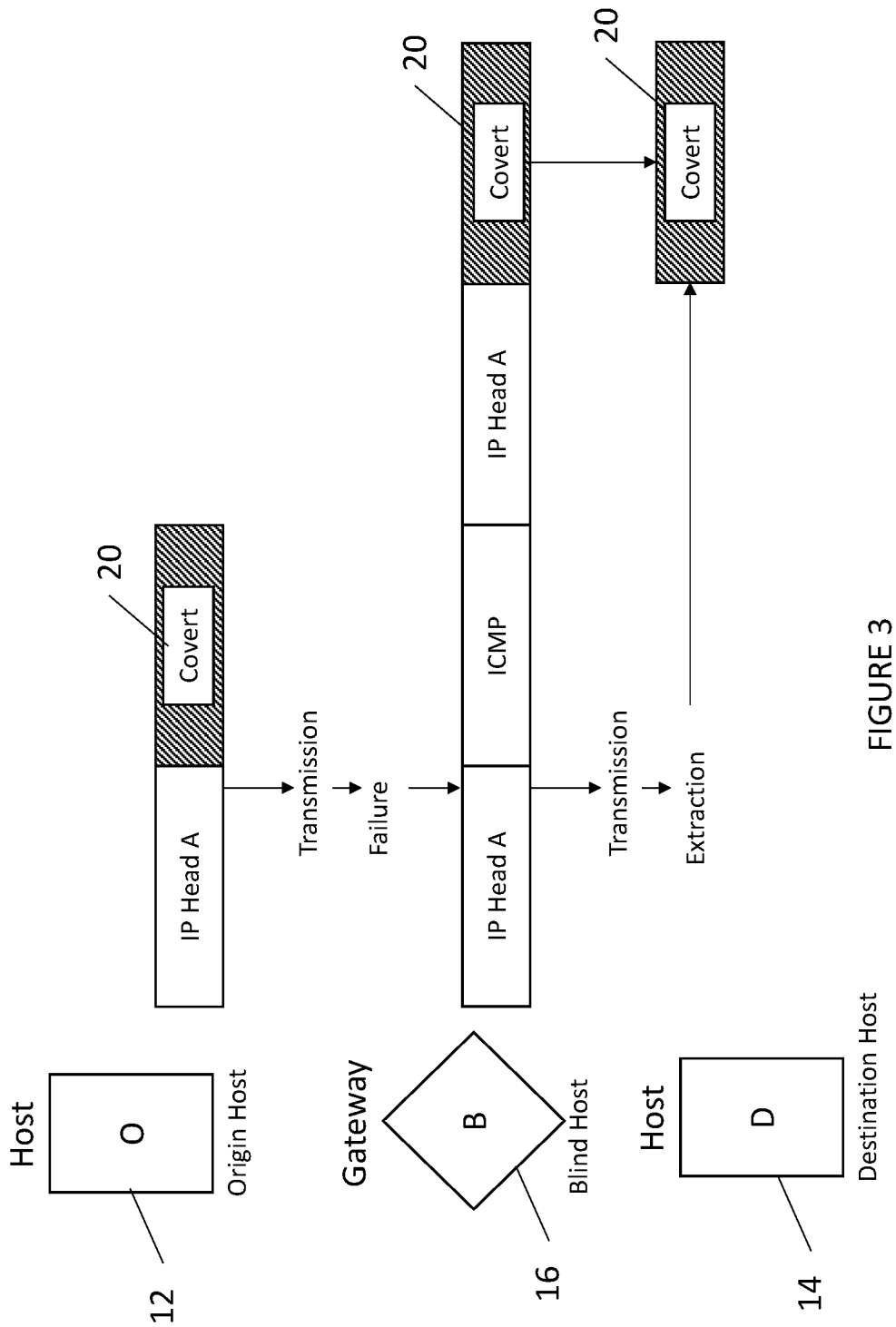
FIG. 3 is an illustration of an operation action for covertly transmitting the payload.

FIG. 2 is a flowchart with exemplary logic for covertly transmitting a payload 20. FIG. 3 is an illustration of an operation action for covertly transmitting the payload 20. The origin host 12 may carefully select the appropriate host to unwittingly act as the blind host 16. The blind host 16 may have at least the following exemplary characteristics, which are provided without limitation.

The blind host 16 may be a correctly implemented gateway for the network 10. The blind host 16 may be configured to produce properly formatted error messages based upon erroneous network traffic. The blind host 16 may be configured to produce such error messages in conformance with various ICMP protocols, such as those defined by RFC 792, though any protocol is contemplated.

Alternatively, or additionally, the blind host 16 may be reachable from the origin host 12, the destination host 14, and the fictitious host 18. In this way, it may be plausible that datagram(s) received from the blind host 16, including the datagram(s) 30 containing the payload(s) 20, could plausibly have arrived from any of these hosts 12, 14, and 18 and plausibly have been routed or rerouted back to any or all of these hosts 12, 14, and 18. Stated another way, the blind host 16 may be placed along a communication pathway extending between the origin host 12, the destination host 14, and the address for the fictitious host 18 (as the fictitious host 18 may not actually exist on the network 10 or elsewhere).

The origin host 12 may be configured to determine the position that the blind host 16 holds within the communication pathway between the origin host 12 and the destination host 14. Because the origin host 12 may be configured to intentionally create a datagram 30 that will produce an error message when processed at the blind host 16, the number of additional gateway transfers between at least the origin host 12 and the blind host 16 may need to be determined or otherwise known. In the exemplary embodiment illustrated in FIG. 1, the blind host 16 holds a position of 1, as there are no other gateways necessary for routing between the origin host 12 and the destination host 14. However, any position for the blind host 16 is contemplated as any number of gateways may exist between the origin host 12 and the destination host 14. The reason for determining or knowing the position of the blind host 16 is further explained herein.

Figure 4:
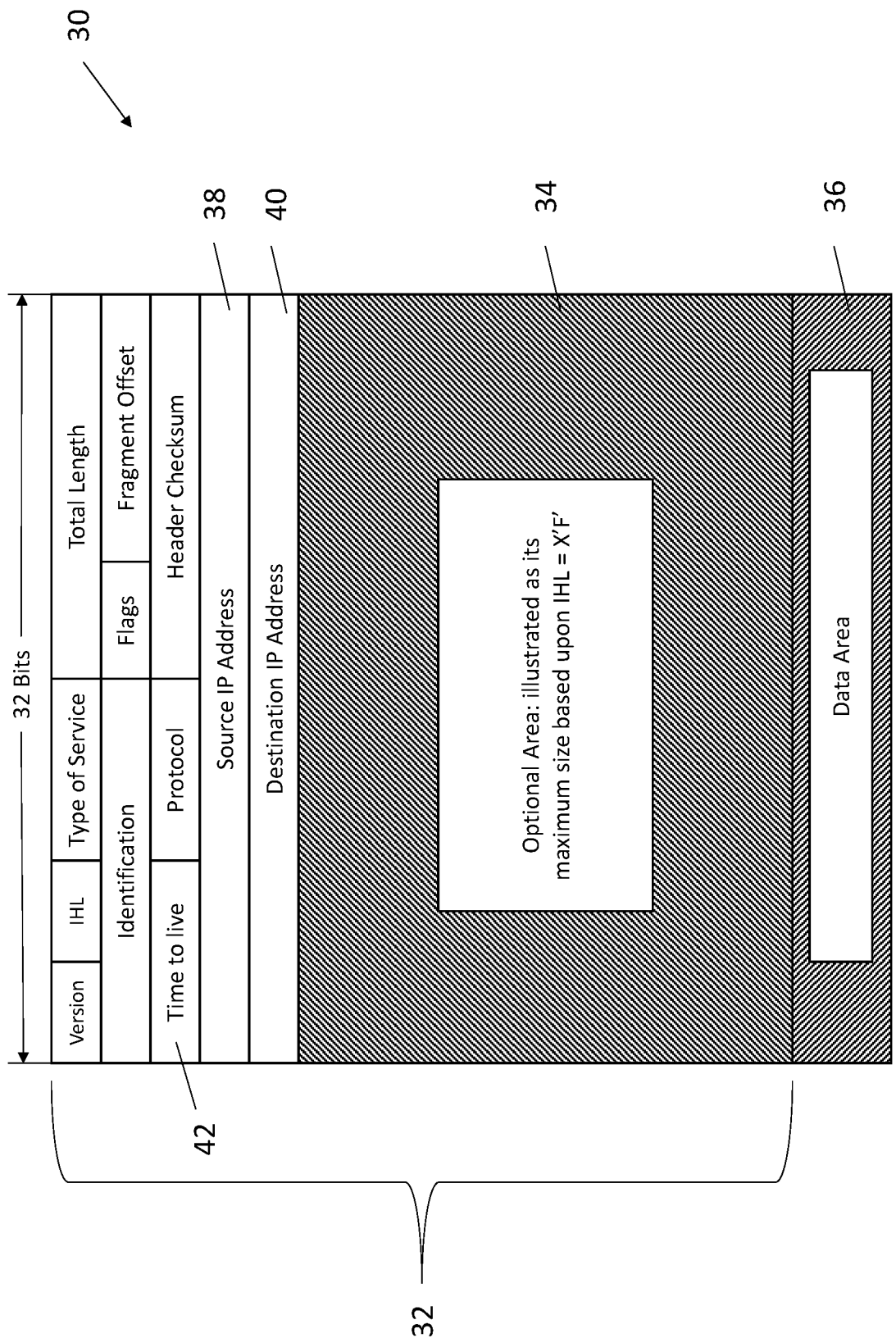
FIG. 4 is a simplified visual representation of an exemplary datagram.
Figure 5:
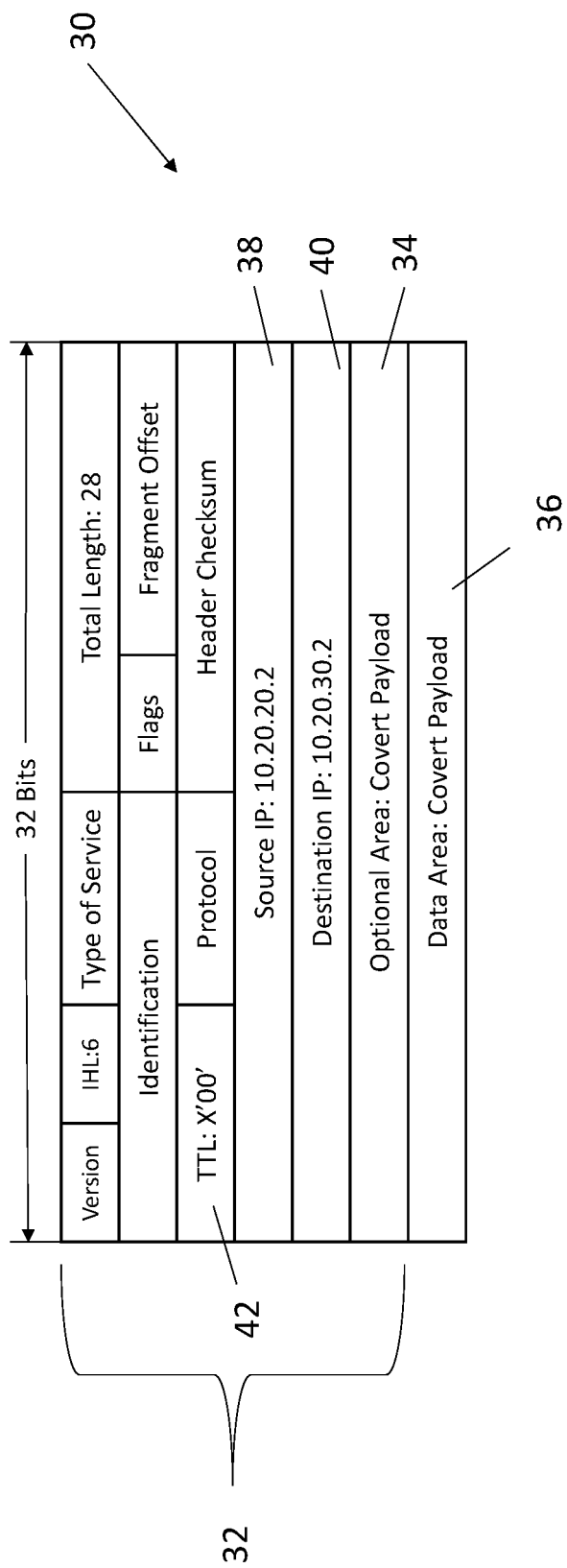
FIG. 5 is another simplified visual representation of the exemplary datagram of FIG. 4.
Figure 6:
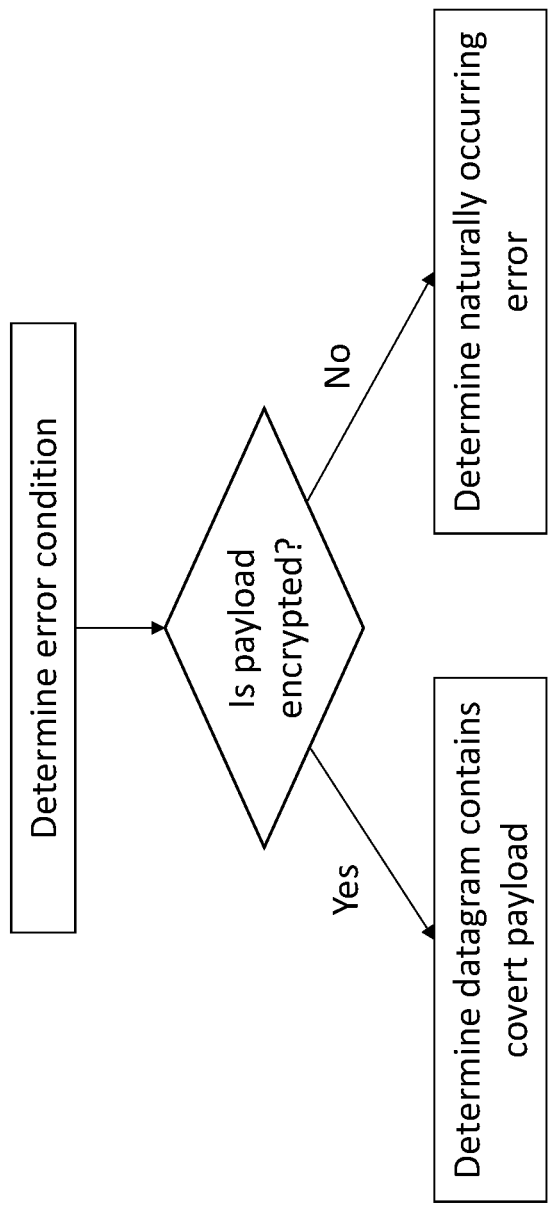
FIG. 6 is a flowchart with exemplary logic for detecting covert transmission of a payload.
Figure 7:
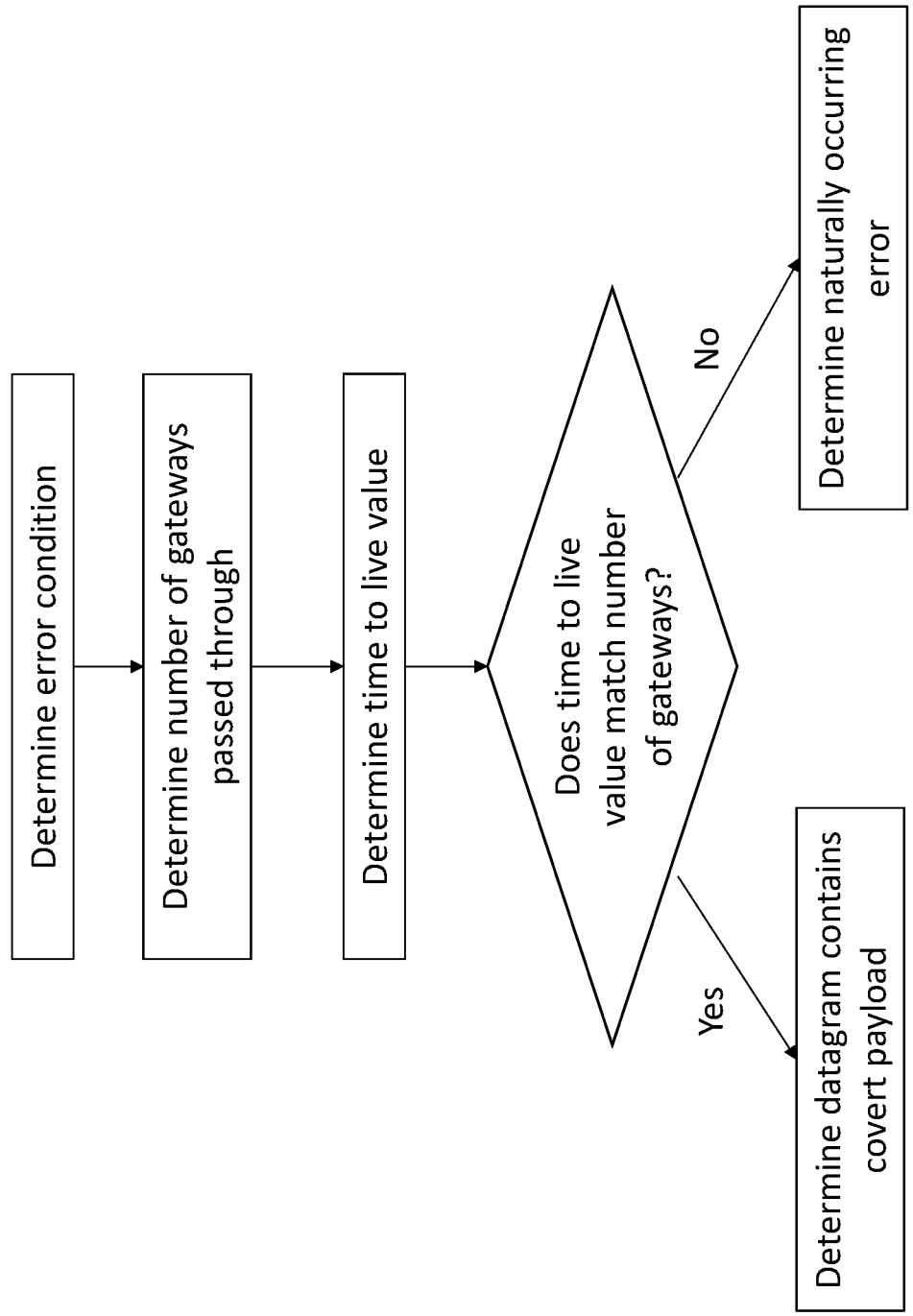
FIG. 7 is another flowchart with other exemplary logic for detecting covert transmission of a payload.
Figure 8:
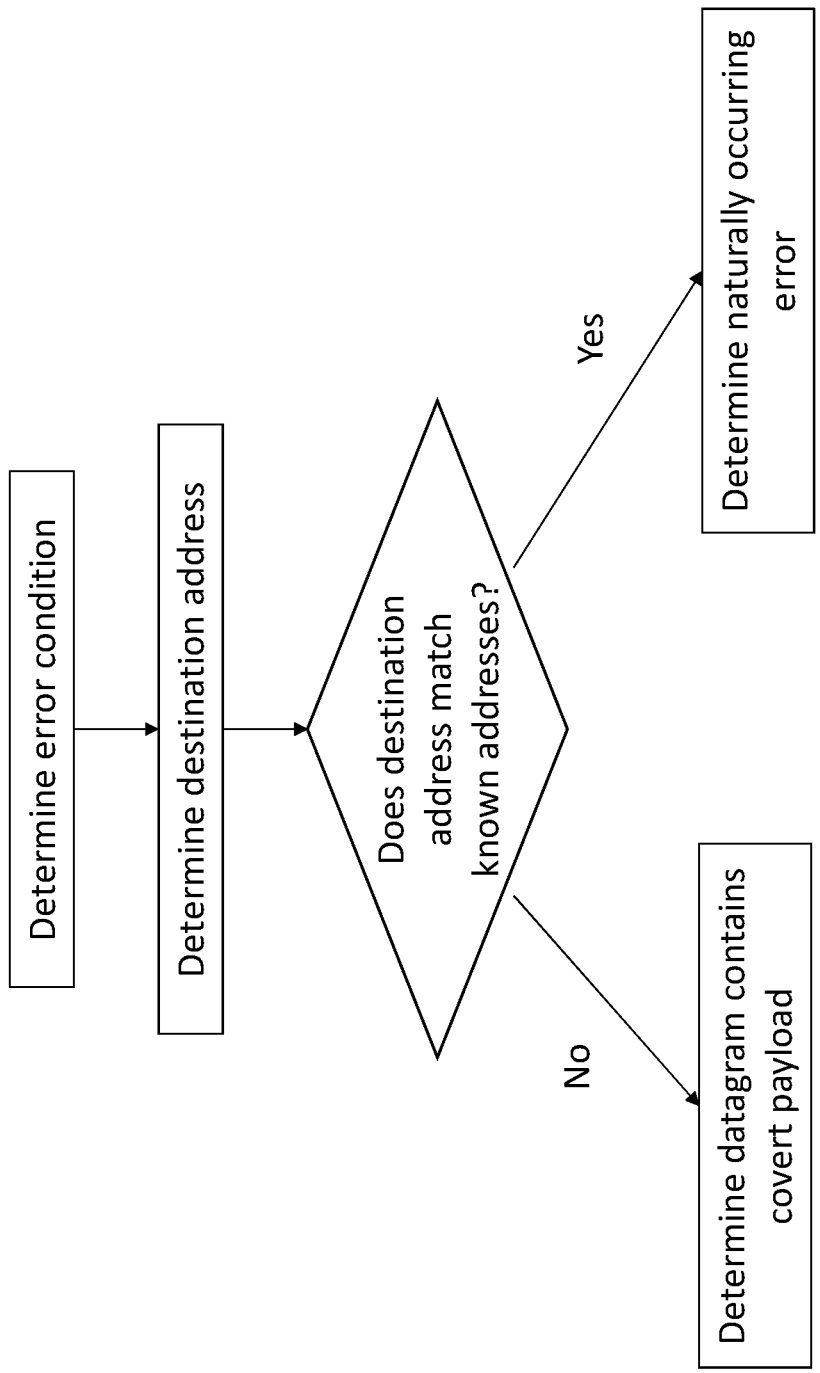
FIG. 8 is another flowchart with other exemplary logic for detecting covert transmission of a payload.
Figure 9:
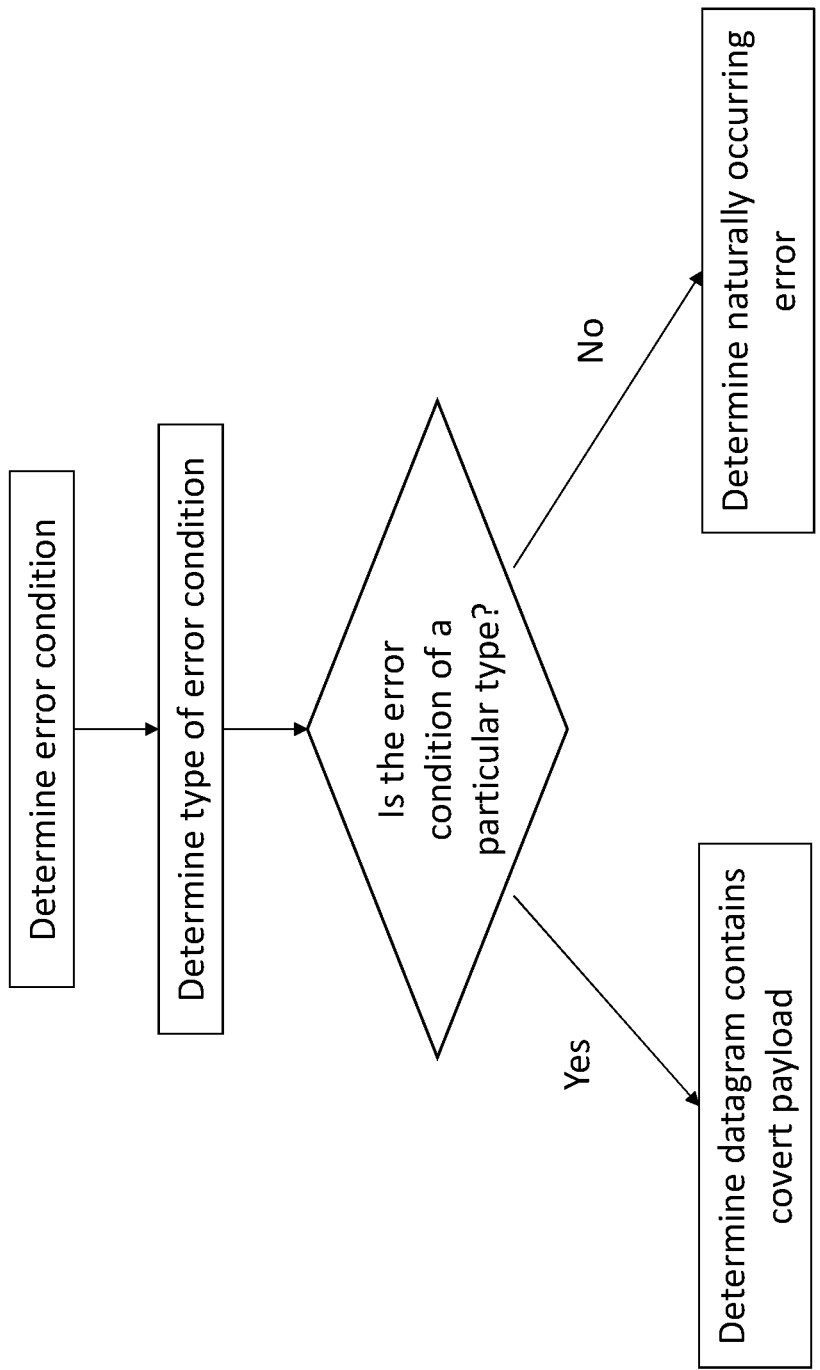
FIG. 9 is another flowchart with other exemplary logic for detecting covert transmission of a payload.

FIG. 4 is a simplified visual representation of an exemplary a datagram 30. FIG. 5 is a simplified visual representation of an exemplary header 32 for the datagram 30 of FIG. 4. The origin host 12 may be configured to create a unit of information, the datagram 30, containing the payload 20 to be transmitted to the destination host 14. The payload 20 may be limited in size and location. In other exemplary embodiments, the payload 20 may be spread across multiple datagrams 30. The payload 20 may be wholly contained within an optional area 34 of the header 32 and/or within the data area 36 that immediately follows the header of the datagram 30. In exemplary embodiments, the datagram 30 may be an IP datagram. The datagram 30 may be properly formatted in conformance with at least RFC 791, though other standards, protocols, sizes, configurations, and types of datagrams 30 are contemplated. The data area 36 may be 64 bits in size, though any size is contemplated. The header 32 may be 32 bits in size, though any size is contemplated.

While this might, at first glance, seem a restrictively small amount of payload, there is ample room within the optional area 34 of the header 32 itself. For example, without limitation, in exemplary embodiments with the full optional area 34 and data area 36 of 64 bits in size following the header 32 utilized, a total payload 20 of 12 full words, or 48 bytes, may be available.

The origin host 12 may be configured to create the datagram 30 that will contain the encapsulated payload 20 intended for covert transmission. It is contemplated that the payload 20 may be further secured by encryption, password, or the like, though such is not required. The datagram 30 may have a specially designed construction to engage certain actions at the blind host 16, such as but not limited to, generation of an error message upon receipt and processing. The blind host 16, which may be configured to follow the protocol rules, may be forced to generate a transmission containing the payload 20 to the destination host 14. Furthermore, the datagram 30 may be constructed such that no relationship or identifying information regarding the origin host 12 may be contained within the datagram 30 such that the origin host's 12 identity is concealed from the destination host 14.

The datagram 30 may comprise a source address 38. The source address 38 may identify the address of the destination host 14. In exemplary embodiments, the address may be an IP address, though any type or kind of address is contemplated. The datagram 30 itself may contain some property that will cause the blind host 16 to generate an error message. In exemplary embodiments, this property may be configured to create an error under ICMP rules, though other protocols, rules, standards, and the like are contemplated. In this way, the blind host 16 may be programmed to send an error message and that message may be directed to the source address 38, which may be the address of the destination host 14. The idea here is that the blind host 16 may receive a transmission that it finds in error. Following the ICMP rules, the blind host 16 may generate and send an error message back to the host it believes created the error in the first place. Since the destination host's 14 address may be provided in the source address field 38, the blind host 16, following the protocols, may assume that the destination host 14 is the origin of the transmission and may report its discovered error to that address, unwittingly delivering a transmission to the destination host 14.

The destination address 40 may identify the address of the fictitious host 18. In exemplary embodiments, the address may be an IP address, though any type or kind of address is contemplated. This may mask the identity of the origin host 12. If an examination of the traffic is performed, then the fictitious host 18 may appear to be the source of the datagram 30 rather than the origin host 12.

It is possible to cause the blind host 16 to generate the error message in a variety of ways. In exemplary embodiments, the time to live field 42 may contain a value which is configured to generate creation of the error message at the blind host 16. In this way, the transmission from the origin host 12 may force the blind host 16 to generate the error message, preferably in accordance with ICMP, though any rules, protocols, standards, or the like are contemplated. The time to live field 42 on the header 32 is just one example of how to cause creation of the error message and this example is provided without limitation.

As traffic passes through gateways (such as the blind host 16), the value in the time to live field 42 is generally reduced by one. Once a gateway or host receives a datagram 30 that has a zero in the time to live field 42, the gateway or host may be configured to produce an error message for return to the point of origin of the datagram 30 prior to discarding the datagram 30 in question. As such, the origin host 12 may be configured to create the datagram 30 containing the payload 20 with the time to live field 42 containing a value designed to cause the blind host 16 to discard the datagram 30 and send an error message to the address contained in the source address field 38 of the datagram 30. For example, without limitation, where the blind host 16 is the first gateway in the network 10, such as illustrated in FIG. 1, the time to live field 42 may be set to one or zero such that the blind host 16 is configured to generate an error message upon receipt and processing. As another example, without limitation, where the blind host 16 is the third gateway in the network 10, the time to live field 42 may be set of a value of three or less such that the datagram 30 is successfully passed through the first two gateways, but then an error message is generated upon receipt at the third gateway—i.e., at the blind host 16. As such, the origin host 12 may be configured to determine the number of gateways between the origin host 12 and the blind host 16 or such information may be otherwise known to the origin host 12.

Once the datagram 30 comprising some or all of the payload 20 is constructed and transmitted from the origin host 12 to the blind host 16 (directly or through one or more gateways), a series of predetermined behaviors may take place. These behaviors may conform to the defined actions of a properly implemented IP gateway within an IP network, as defined by RFC 791 an RFC 792, though any standard, protocol, rules, or the like are contemplated. After the blind host 16 receives the datagram 30 and determines that the time to live 42 is zero (before or after reducing the time to live 42 value), then the error message may be constructed at the blind host 16. The error message may contain the payload 20 within a copy of the original datagram header 32 and data area 36 following the header 32 as required by protocols, rules, standards, or the like. This error message may be transmitted to the address specified in the source address 38. This address may be the address for the destination host 14. This error message may be transmitted to the destination host 14 having preserved the payload 20 within the error message. The destination host 14, when receiving the error message, may unpack the payload 20 while identity of the origin host 12 may remain undisclosed.

In exemplary embodiments, the error message may list the address of the blind host 16 in the source address field 38 and the address of the destination host 14 in the destination address field 40. While the addresses described herein may be IP addresses, other types, formats, or configurations of addresses are contemplated. Furthermore, while certain actions are described herein with respect to current ICMP protocols, any set of protocols, past, present, or future, are contemplated. Any number of datagrams containing any number of payloads, or a single payload spread across multiple datagrams, is contemplated.

FIG. 6 through FIG. 9 illustrate flowcharts with exemplary logic for detecting the datagram 30 intended for covert transmission. The identification of an error condition may be established. Such error conditions may be established where an inbound datagram 30 is received by the network 10 that contains some kind of an error. The error may be one which triggers the requirement to produce an error message, such as but not limited to an ICMP error message, such as for transmission back to the originating host 12, 14, 16, 18. One or more of the blind hosts 16 may be used to detect such error conditions. The blind hosts 16 may be unaware of their involvement in the error creation and/or detection process. The blind host 16 may note the receipt of the datagram 30. It is possible that such noted datagrams 30 may or may not comprise a covert payload 20. The datagram 30 may be isolated, to determine the presence or non-presence of such a covert payload 20.

Once an error condition has been detected, the one or more blind hosts 16 may be configured to continue to evaluate the isolated datagram 30. The one or more blind hosts 16 may be configured to examine the potential payload 20 to identify whether such data is in an encrypted format. The presence of an encryption may indicate that the datagram 30 contains a payload 20 intended for covert transmission. While it is possible that such data might simply be corrupted, it is unlikely that subsequent datagrams 30 would have the same general errors, therefore, encrypted payloads 20 may be flagged as being highly suspect. For example, without limitation, where more than one such datagram 30 with encrypted information is received, such the blind host 16 may be configured to determine that the datagram 30 contains a payload 20 intended for covert transmission.

The blind hosts 16 may be configured to generate error messages, such as but not limited to ICMP error messages, in response to the detection of such error conditions. Such one or more blind hosts 16 may be configured to detect an unlikely error condition, such as one which appears to be contrived. An error message may be produced when the time to live field 42 is decremented to zero. This may provide a safeguard that is designed to overcome problems where data is routing in a circular fashion within a network 10. As the datagram passes through a gateway, the datagram's 30 time to live value 42 may be decremented, such as but not limited to, by one. If the time to live value 42 drops to zero, or some other threshold, an error message may be sent to the address indicated in the source address 38. The error message may indicate that the datagram 30 has not reached its intended destination. However, if the datagram 30 contains a covert payload 20, the time to live field 42 may be used to intentionally drive transmission of an error message and operate the bounce back process. In such situations, the number of gateways traversed, and/or required for traverse, within the network 10 may match the time to live value 42. This may provide an indication that the time to live value 42 was manipulated or otherwise used to intentionally generate an error message, rather than its design objective.

The blind hosts 16 may be configured to transmit error messages to the source address 38 of the datagram 30 perceived to create the error condition. Normally, this would be the datagram's 30 origin. However, the sources address 38 may be manipulated to obscure the real origin of the datagram 30 in those datagrams 30 having a payload 20 intended for covert transmission. Since the blind host 16 may be unwittingly used, it is unlikely that normal traffic will come and go from this host 16. In other words, if the destination address 40 is set to a host 12, 14, 16, 18 for which the one or more blind hosts 16 has had no previous intentional communication, then it is likely that this datagram 30 is being used to carry covert information 20. By maintaining a statistical tally or other tracking of hosts 12, 14, 16, 18 to which the one or more blind hosts 16 has previously communicated, this type of traffic may be identified and potentially eliminated. For example, without limitation, a comparison may be made between the listed address in the destination field 40 for the error generating datagram 30 against a list of known addresses. Where the listed address in the destination field 40 does not match any known address, it may be determined that the datagram 30 comprises a payload 20 intended for covert transmission.

Communication between hosts 12, 14, 16, 18 may be designed to be managed and improved by the existence of error messages. These messages may permit traffic flow to be redirected, corrected, and improved. Therefore, it is likely that a message will arise out of expected activity, rather than occur without being produced or provoked out of unexpected behavior. By maintaining a careful record of active connections and expected transfers, it is possible to identify unexpected traffic and eliminate network packets that contain covert payloads 20.

By monitoring digital behavior, systematic identification network traffic that contains covert payloads 20 may be accomplished. While some patterns may result from naturally occurring errors, the combination of, for example without limitation, two or more suspicious activities may be sufficiently unlikely so as to safely assume that the datagram 30 contains a payload 20 intended for cover transmission. Likewise, the presence of no such errors conditions and/or suspicious activities, or only one suspicious activity, may be sufficient indication that the datagram 30 does not contain a payload 20 intended for covert transmission.

Even where an error message or transmission of a datagram 30 flagged as suspicious is suppressed, the negative effect upon the network 10 may be negligible, as the traffic has been identified to be unrelated, unexpected, and potentially an aberrant error. In other words, if a packet 30 is incorrectly identified as containing covert data 20, an erroneous datagram 30 may have nonetheless be identified and such that the elimination would cause no bad effects on the network 10.

In other exemplary embodiments, the type of error condition may be determined. If the error is of a certain type, it may be determined that the datagram 30 comprises a payload 20 intended for covert transmission. If the error is not of the certain type, it may be determined that the datagram 30 does not comprise a payload 20 intended for covert transmission. For example, without limitation, the types of error conditions which trigger suspicions may be relatively uncommon errors, thus indicating artificial manipulation. As another example, without limitation, the types of error conditions which trigger suspicions may be relative common errors used to hide their malicious nature. As another example, without limitation, the types of error conditions which trigger suspicions may be unrelated to any activity expected at the network 10 and/or the hosts 12, 14, 16, and/or 18. As another example, without limitation, the types of error conditions which trigger suspicions may be related to formation of the datagram 30 that appears to have been designed in error. As another example, without limitation, the types of error conditions which trigger suspicions may be related to fragmentation where the datagram 30 does not appear to have fragmentation requirements.

Any of the techniques shown and/or described with respect to FIGS. 6-9 may be utilized together or separately to determine that the datagram 30 contains a payload 20 intended for covert transmission or not. In exemplary embodiments, such a determination may be made where one or more of the conditions shown and/or described with respect to FIGS. 6-9 are determined to be present. Likewise, such a determination may be made where one or more of the conditions shown and/or described with respect to FIGS. 6-9 are determined to not be present.

The blind host 16 may be configured to isolate any datagrams 30 for which a determination has been made that the datagram 30 contains a payload 20 intended for covert transmission. The blind host 16 may be configured to generate an alert in response to such determination, eliminate the datagram 30, suspend and/or shut down network 10 communications, some combination thereof, or the like.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may be personal computers, smartphone, tablets, databases, servers, or the like. The electronic connections described herein may be accomplished by wired or wireless means.

What is claimed is:

1. A method for detecting transmission of covert payloads of data, said method comprising the steps of:
    receiving a datagram at a host within a network;
    determining that processing of the datagram creates an error condition;
    determining that the datagram comprises at least each of the following suspicious conditions:
        an encrypted payload;
        a destination not matching any known address for hosts within the network;
        a time to live value matching a number of gateways traversed by said datagram within said network; and
        the error condition being of a particular type; and
    subsequently, determining that the datagram contains a payload intended for covert transmission.

2. The method of claim 1 wherein:
the determination that the datagram comprises the suspicious conditions is made at the host.

3. The method of claim 1 wherein:
the network is an IP network.

4. The method of claim 3 wherein:
the host is configured to generate ICMP error messages.

5. The method of claim 1 further comprising the steps of:
generating an alert message indicating the presence of the suspicious conditions.

6. The method of claim 1 wherein:
the particular type of error condition comprises statistically uncommon errors relative to a sample pool of datagrams.

7. The method of claim 1 wherein:
the particular type of error condition comprises statistically common errors relative to a sample pool of datagrams.

8. The method of claim 1 wherein:
the particular type of error condition is related to fragmentation.

9. The method of claim 1 wherein:
the particular type of error condition is related to formation of the datagram.

10. The method of claim 1 wherein:
the particular type of error condition is unrelated to activity expected on the network.

11. A system for detecting transmission of covert payloads of data comprising:
a network comprising a number of hosts, wherein each of said hosts comprises an address; and
software instructions, located at each of said hosts, which when executed configures each of the hosts to:
receive a number of datagrams;
process each of said datagrams in accordance with preprogrammed protocols;
identify received datagrams creating an error condition when processed according to said preprogrammed protocols;
determine if suspicious conditions exist in the identified datagrams, said suspicious conditions comprising: an encrypted payload, a destination address comprising a valid address not matching any of said addresses for said hosts, a time to live value matching a number of gateways traversed by said datagram within said network, and the error condition being of a particular type;
subsequently, determine that the datagram contains a payload intended for covert transmission where at least one or more of said suspicious conditions are present; and
generate an alert message regarding the payload intended for covert transmission.

12. The system of claim 11 wherein:
the particular type is selected from the group consisting of: statistically uncommon error conditions relative to a sample pool of datagrams, statistically common error conditions relative to the sample pool of datagrams, error conditions related to fragmentation, error conditions related to formation of the datagram, and error conditions unrelated to activity expected on the network.

13. The system of claim 11 wherein:
the network is an IP network; and
each of said hosts are configured to generate ICMP error messages upon determination of said error condition.

14. A method for detecting transmission of covert payloads of data comprising the steps of:
receiving datagrams at a host within an IP network comprising a number of blind hosts, each associated with an address and configured to generate error messages upon receipt of datagrams meeting certain error conditions in accordance with preprogrammed protocols;
determining that processing of at least one of the datagram creates an error condition under said preprogrammed protocols;
determining that the at least one datagram comprises each of the following suspicious conditions:
an encrypted payload;
a destination of a valid address not matching any of said addresses for said hosts within the network;
a time to live value matching a number of gateways traversed within said network;
the error condition is statistically uncommon relative to a sample pool of datagrams; and
the error condition is at least one of: related to fragmentation, related to formation of the datagram, and unrelated to activity expected on the network;
subsequently, determining that the at least one the datagram contains a payload intended for covert transmission;
isolating the at least one datagram;
generating an alert message regarding the at least one datagram; and
eliminating the at least one datagram.

* * * * *